(12) United States Patent
Mouillon et al.

(10) Patent No.: US 11,828,313 B2
(45) Date of Patent: Nov. 28, 2023

(54) FASTENING DEVICE FOR ATTACHING TWO PLANAR ELEMENTS

(71) Applicant: A. RAYMOND ET CIE, Grenoble (FR)

(72) Inventors: Romain Mouillon, Voreppe (FR); Sebastien De Marco, Saint Pierre De Chartreuse (FR)

(73) Assignee: A. RAYMOND ET CIE, Grenoble (FR)

( * ) Notice: Subject to any disclaimer, the term of this patent is extended or adjusted under 35 U.S.C. 154(b) by 404 days.

(21) Appl. No.: 17/261,289

(22) PCT Filed: Jun. 19, 2019

(86) PCT No.: PCT/FR2019/051499
§ 371 (c)(1),
(2) Date: Jan. 19, 2021

(87) PCT Pub. No.: WO2020/016497
PCT Pub. Date: Jan. 23, 2020

(65) Prior Publication Data
US 2021/0262510 A1 Aug. 26, 2021

(30) Foreign Application Priority Data
Jul. 19, 2018 (FR) ........................................ 1856690

(51) Int. Cl.
*F16B 19/10* (2006.01)
*F16B 21/07* (2006.01)

(52) U.S. Cl.
CPC ........ *F16B 19/1081* (2013.01); *F16B 21/075* (2013.01)

(58) Field of Classification Search
CPC ... F16B 13/126; F16B 19/1081; F16B 21/075
(Continued)

(56) References Cited

U.S. PATENT DOCUMENTS 3,074,134 A * 1/1963 Buechler ................. F16B 5/128
52/716.7
4,114,509 A * 9/1978 Poe ....................... F16B 21/075
24/607
(Continued)

FOREIGN PATENT DOCUMENTS

DE 102010034006 A1 2/2012
DE 102016012437 A1 4/2018
(Continued)

OTHER PUBLICATIONS

Indian Examination Report for Application No. 202017054888 dated May 19, 2022, 6 pages.
(Continued)

*Primary Examiner* — Flemming Saether
(74) *Attorney, Agent, or Firm* — TraskBritt (57) ABSTRACT

A fastening device for attaching an assembly comprising at least two planar elements, comprises: A clip for insertion into openings in the planar elements for holding the planar elements together including a planar head having a central opening for providing access to an inner cavity of the clip; two lateral upright members having a first end that is secured to the head and a second end, the second ends being joined to each other; and a pin that is intended to be inserted into an inner cavity in the clip in order to lock the assembly. The pin comprises at least one flexible bridging piece having a central portion that is connected to a main body of the pin by means of two flexible portions, and the pin contacts a lateral upright member of the clip to lock and hold the assembled planar elements together.

20 Claims, 5 Drawing Sheets

(58) Field of Classification Search
USPC .................................................. 411/45–48
See application file for complete search history.

(56) References Cited

U.S. PATENT DOCUMENTS

| | | | |
|---|---|---|---|
| 5,775,860 A | 7/1998 | Meyer | |
| 6,074,144 A * | 6/2000 | Meyer | F16L 3/223 411/41 |
| 7,243,401 B2 * | 7/2007 | Sawatani | F16B 19/1081 24/297 |
| 7,484,919 B2 * | 2/2009 | Hansen | F16B 41/002 411/41 |
| 8,496,420 B2 | 7/2013 | Aoki et al. | |
| 10,202,084 B2 * | 2/2019 | Hübner | B60R 13/0206 |
| 2006/0066080 A1 | 3/2006 | Ikeda et al. | |
| 2014/0093325 A1 | 4/2014 | Mizukoshi et al. | |
| 2016/0305461 A1 | 10/2016 | Nakajima | |

FOREIGN PATENT DOCUMENTS

| | | |
|---|---|---|
| EP | 1209370 | 1/2007 |
| EP | 3067574 A1 | 9/2016 |
| GB | 0848100 A | 9/1960 |
| JP | 2014-070693 A | 4/2014 |
| RU | 2674522 C2 | 12/2018 |
| WO | 03/72957 A2 | 9/2003 |
| WO | 2016/171863 A1 | 10/2016 |

OTHER PUBLICATIONS

International Search Report for International Application No. PCT/FR2019/051499, dated Dec. 18, 2019, 8 pages.
International Written Opinion for International Application No. PCT/FR2019/051499, dated Dec. 18, 2019, 9 pages.
European Communication pursuant to Article 94(3) EPC for European U.S. Appl. No. 19/790,610, dated Sep. 23, 2022, 3 pages.
Russian Notice of Grant and Search Report for Application No. 2021112148/28 dated Oct. 21, 2022, 11 pages.

* cited by examiner

FASTENING DEVICE FOR ATTACHING TWO PLANAR ELEMENTS

CROSS-REFERENCE TO RELATED APPLICATIONS

This application is a national phase entry under 35 U.S.C. § 371 of International Patent Application PCT/FR2019/051499, filed Jun. 19, 2019, designating the United States of America and published as International Patent Publication WO 2020/016497 A1 on Jan. 23, 2020, which claims the benefit under Article 8 of the Patent Cooperation Treaty to French Patent Application Serial No. 1856690, filed Jul. 19, 2018.

TECHNICAL FIELD

The present disclosure relates to a fastening device for attaching planar elements. This type of device is particularly useful in the automotive field.

BACKGROUND

In the automotive field, it may be necessary to be able to fasten planar elements together such as supports or modules on parts of a vehicle. This may, for example, involve attaching a panel on a door or even a mud shield on part of the bodywork. There are several fastening techniques to achieve this goal, such as the use of connecting rivets or screws. However, these techniques can make the fastener complicated to install and difficult to remove.

The fastening devices known from documents U.S. Pat. No. 8,496,420, DE1020010034006 and WO2016171863 seek to remedy these drawbacks. These documents present a fastening device consisting of a clip and a pin. Each planar element is provided with an opening, and the openings are placed opposite each other when the two planar elements are placed against each other in the assembly position. The clip is introduced into the openings and then the pin is placed in the clip so as to lock the assembly and fasten the two planar elements together.

The planar elements can have a variable thickness from one assembly to another. The assembly force of the fastening devices of the state of the art, and in particular, the force, which must be applied to the pin to make it penetrate into the clip, can vary based on the effective thickness of the two planar elements, which must be assembled. This assembly force can thus become excessive when the thickness of the assembly exceeds a determined thickness, which is not desirable.

BRIEF SUMMARY

With a view to achieving this aim, the object of the present disclosure provides a fastening device for attaching an assembly comprising at least two planar elements, the planar elements being provided with openings that face each other when they are in the assembly position, the fastening device comprising a clip, which is intended to be inserted into the openings of the planar elements and to hold the planar elements together between a first and a second support point.

The clip comprises a planar head so as to form the first support point on the main surface of one of the planar elements, the planar head having a central opening in order to access an inner cavity of the clip; two lateral upright members designed to form the second support point on another of the planar elements, the lateral upright members having a first end, which is secured to the head as well as a second end, the second ends being joined to each other in such a way that the two lateral upright members define the inner cavity of the clip.

The fastening device also comprises a pin, which is intended to be inserted into the inner cavity of the clip in order to lock the assembly. According to the present disclosure, the pin comprises at least one flexible bridging piece having a central portion, which is connected to a main body of the pin by two flexible portions, the flexible bridging piece being intended to come into contact with a lateral upright member of the clip in order to be force-locked at the second support point and to hold the assembled planar elements together.

According to other advantageous and non-limiting features of the present disclosure, taken alone or in any technically feasible combination:

- the planar head of the clip is formed by two support pallets, each support pallet being secured to a lateral upright member;
- each support pallet comprises at least one arm partially defining the outline of the central opening;
- the head of the clip is provided with slots to cooperate with guide ribs arranged on the pin;
- the lateral upright members have a V shape;
- the pin bears at least one retaining notch, which is intended to be housed in at least one locking hole of the clip to hold the pin in the clip in the delivery position;
- the pin bears at least one locking notch, which is intended to be housed in the locking hole of the clip to hold the pin in the clip in the locking position;
- each lateral upright member of the clip has a blocking tab, which is intended to cooperate with a blocking zone of the pin so as to hold the pin in the clip in the locking position;
- the pin is topped by a head;
- the head of the pin is provided with at least one slot, which is intended to accommodate the end of a tool so as to facilitate the dismantling of the fastening device;
- the central portion of the bridging piece bears a boss;
- the pin is made from plastic and the clip from metal;
- the pin comprises a pair of flexible bridging pieces for contacting the side upright members of the clip.

BRIEF DESCRIPTION OF THE DRAWINGS

Further features and advantages of the present disclosure will become apparent from the following detailed description of the present disclosure, with reference to the accompanying drawings, in which.

DETAILED DESCRIPTION

In order to simplify the following description, the same reference signs are used for identical elements or for elements performing the same function. The drawings are schematic representations, which, for the sake of readability, are not to scale.

General Description of the Fastening Device

Figure 1:
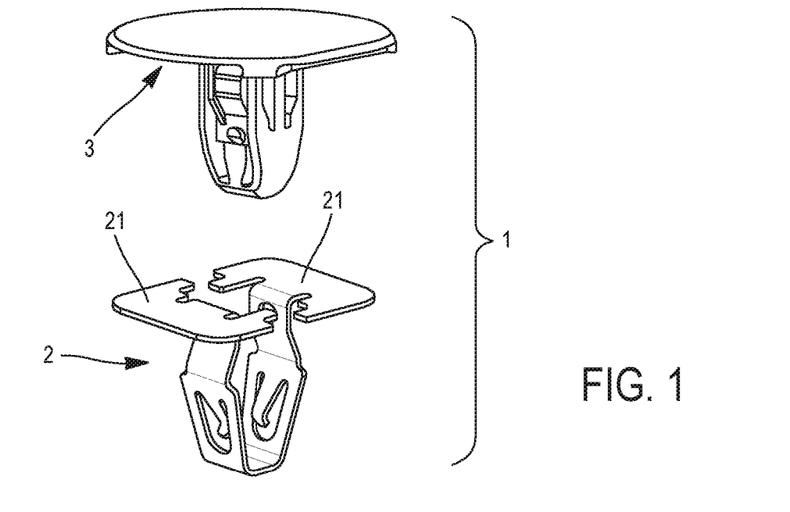
FIG. 1 shows a fastening device according to the present disclosure in exploded view.

FIG. 1 shows a fastening device 1 of an assembly comprising at least two planar elements in accordance with the present disclosure. The fastening device 1 consists of a clip 2 and a pin 3. The purpose of the fastening device 1 is to keep the planar elements 4 against each other. The term "planar element" 4 is understood to mean an element at least locally having a planar surface in the region where the fastening device 1 will be placed. The planar element does not have to be completely contained in a plane. The planar elements 4 can be of various types; for example, this can be a car door to which it is desired to attach a particular covering or else a mud shield that it is desired to attach to a portion of the bodywork.

For the sake of simplification of the following description, it will be considered that the assembly is formed by two planar elements; however, this does not exclude the possibility of being able to hold a greater number of planar elements 4 between them, for example, if it is beneficial to insert one or a plurality of insulating elements between two elements forming the assembly.

As will be described in more detail with reference to FIGS. 6A-6C, each planar element 4 is provided with an opening 41, and the openings 41 are placed opposite each other when the two planar elements 4 are placed against each other in the assembly position. The clip 2 is introduced into the openings 41 so as to place its planar head 21 against a main surface of one of the planar elements 4, referred to as upper planar element, and thus to form a first support point A. Then the pin 3 is positioned in the clip 2 in order to lock the assembly and fasten the two planar elements 4 together between the first support point A and a second support point B formed between the clip 2 and another planar element 4, referred to as lower planar element.

Description of the Fastening Device

Figure 2:
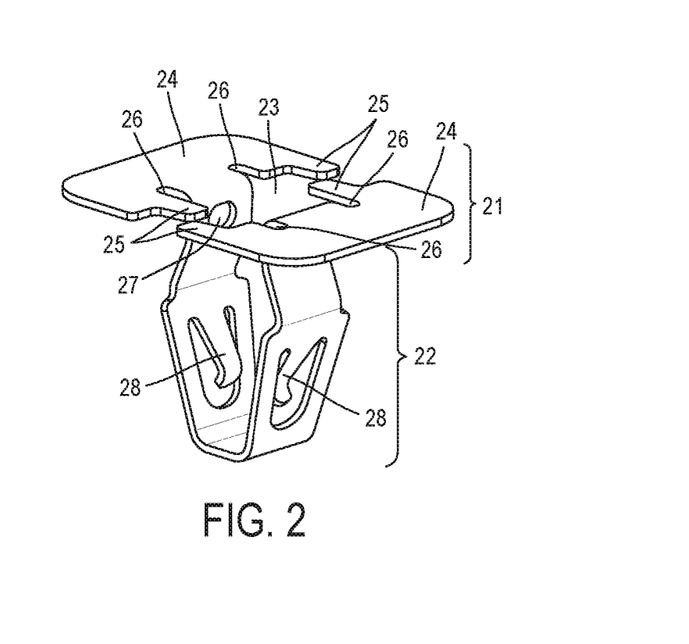
FIG. 2 shows a clip of a fastening device according to the present disclosure.

The clip 2, shown in more detail in FIG. 2, is advantageously made from metal in order to promote its mechanical strength with respect to the planar elements. It can be made from a metal plate by bending and cutting.

The clip 2 comprises a planar head 21 to form the first support point A on the main surface of one of the planar elements 4 and two lateral upright members 22 configured to form the second support point B on another of the planar elements 4. The planar elements 4 will thus be held between the planar head 21 and the lateral upright members 22 of the clip 2 by the two support points A, B.

The planar head 21 has a central opening 23 in order to access an inner cavity of the clip 2 through which the pin 3 will be introduced.

Preferably, the planar head 21 of the clip 2 is formed by two support pallets 24, which are mechanically separated, each support pallet 24 being secured to a lateral upright member 22. The support pallets 24, and the lateral upright members 22, can thus move away from or closer to each another and thus increase or reduce the size of the central opening 23.

Advantageously, each support pallet 24 can comprise at least one lateral arm 25 projecting toward the opposite pallet, partially defining the outline of the central opening 23. These arms 25 thus make it possible to close the central opening 23 and limit the risk of the clips 2 becoming entangled and forming clusters of parts during the stages of manufacturing these parts or transporting them.

The arms 25 can be arranged in different configurations, which are in no way limiting. It is thus possible to have an arm 25 on each support pallet 24, two arms 25 on only one of the support pallets 24, or else to have several arms 25 on each support pallet 24, as shown in FIG. 2.

The lateral upright members 22 having a first end secured to the planar head 21, here respectively secured to a support pallet 24, and a second end. The second ends are joined to each other in such a way that the two lateral upright members 22 define an inner cavity of the clip 2.

Preferably, the lateral upright members 22 have a V shape, the recess of each V being turned toward each other. This V shape promotes contact between the outer faces of the lateral upright members 22 and the lower planar element in order to form the second support point B.

Figure 3:
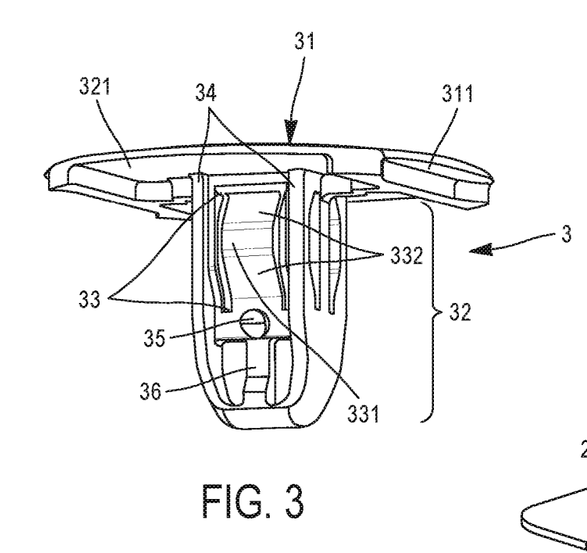
FIG. 3 shows a pin of a fastening device according to a first embodiment of the present disclosure.

FIG. 3 shows a pin 3 according to a first embodiment of the present disclosure. As has already been stated, the pin 3 is intended to be inserted into the inner cavity of the clip 2, through the central opening 23, in order to lock the assembly.

The pin 3 is advantageously made from plastic and produced, for example, by injection or by additive construction.

The pin 3 is formed by a main body 32 and comprises at least one flexible bridging piece 33, here a pair of flexible bridging pieces 33, which are formed on opposite sides of the main body 32, intended to come into contact with at least one of the lateral upright members 22, here with each of these lateral upright members 22, so as to be force-locked with the second support point B and hold the assembled planar elements 4 together. The flexibility of these bridging pieces 33 makes it possible to make the assembly force of the fastening device 1 less dependent on the thickness of the planar elements 4 by being able to deform and compensate for different thickness values.

The flexible bridging pieces 33 are positioned on either side of the main body 32 of the pin 3 so as to face the two lateral upright members 22 of the clip 2. The flexible bridging pieces 33 advantageously comprise a central portion 331, which is connected to the main body 32 of the pin 3 by two flexible portions 332. The flexible portions 332 generally have a lesser thickness than that of the central portion 331 in order to impart flexibility properties to each bridging piece. The central portion 331 is intended to bear on the lateral upright member 22, which faces it.

Figure 4:
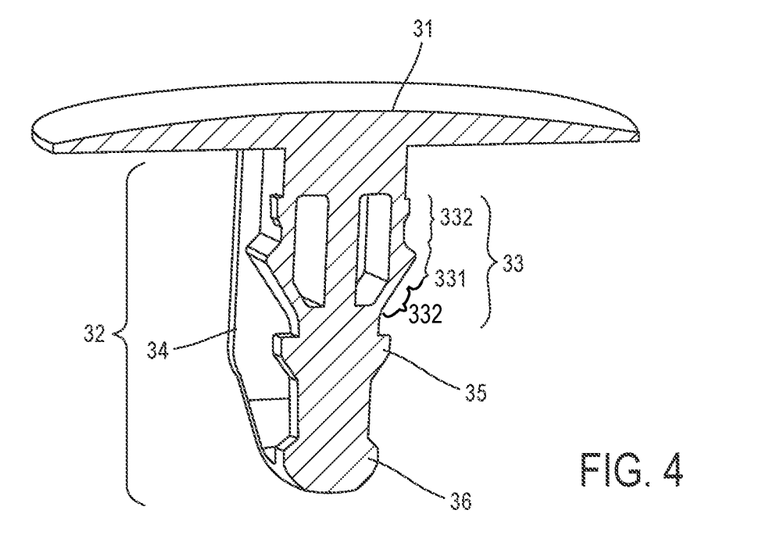
FIG. 4 shows a cross-section of a pin of a fastening device according to a second embodiment.

According to a second embodiment shown in FIG. 4, the central portion 331 of the flexible bridging piece 33 may bear a boss. This boss has a summit whose position can be chosen to come into contact with the lateral upright member, which faces it at a precise moment during the assembly, for example, at the end of the insertion stroke of the pin.

Advantageously, the main body 32 of the pin 3 is topped by a planar head 31. The head 31 of the pin 3 is intended to serve as a support surface to allow easy insertion of the pin 3 into the clip 2 by simple pressure. The head 31 of the pin 3 also serves to limit the insertion of the pin 3 into the clip 2, by stop effect, in order to prevent the pin 3 from fully penetrating the inner cavity of the clip 2 and it no longer being possible to extract it.

Preferably, the head of the pin 3 is provided with at least one slot 311 intended to receive the end of a tool so as to facilitate the dismantling of the fastening device 1. It may, for example, be a flat-head screwdriver, which is inserted into one of these slots 311 in order to be able to exert a leverage effect and separate the pin 3 from the clip 2.

In order to be able to index and guide the insertion of the pin 3 in the inner cavity of the clip 2, the head 21 of the clip 2 can advantageously be provided with slots 26 so as to cooperate with guide ribs 34 positioned on the pin 3. In the embodiment illustrated by FIGS. 2 and 3, the pin 3 is provided with two pairs of guide ribs 34 on either side of each flexible bridging piece 33, and the head 21 of the clip 2 therefore comprises two pairs of slots 26.

Also advantageously, the pin 3 bears at least one retaining notch 35, which is intended to be housed in at least one locking hole 27 of the clip 2 to hold the pin 3 in the clip 2 in the delivery position. The delivery position corresponds to the position in which the pin 3 is assembled to the clip 2 before the flexible bridging pieces 33 pass through the central opening 23 of the clip 2 and come into contact with the lateral upright members 22. In order to obtain this position, the retaining notch 35 is generally positioned upstream from the flexible bridging pieces 33 in the insertion direction of the pin. The retaining notch 35 can advantageously comprise an inclined face in order to be able to be retracted from the locking hole 27 if a sufficient pressure force is exerted on the pin 3.

The pin 3 may also comprise at least one locking notch (not shown in the figures) intended to be housed in the locking hole 27 of the clip 2 in order to hold the pin 3 in the clip 2 in the locking position. The locking position corresponds to the position in which the head 31 of the pin 3 is in abutment with the head 21 of the clip 2. In order to obtain this position, this locking notch is generally positioned downstream from the flexible bridging pieces 33 in the insertion direction of the pin.

To keep the pin 3 in the clip 2 in the locking position, each lateral upright member 22 of the clip 2 can, advantageously, have a blocking tab 28, penetrating the cavity of the clip 2, intended to cooperate with a blocking zone 36 of the pin. The two blocking zones 36 are advantageously located toward the free end of the main body 32 of the pin 3, opposite the planar head 31. The blocking zone 36 can be a switch-on ramp.

Implementation of the Fastening Device

The fastening device 1 of the present disclosure does not require any tool in order to be assembled on the planar elements 4, this assembly comprising several steps.

Figure 5:
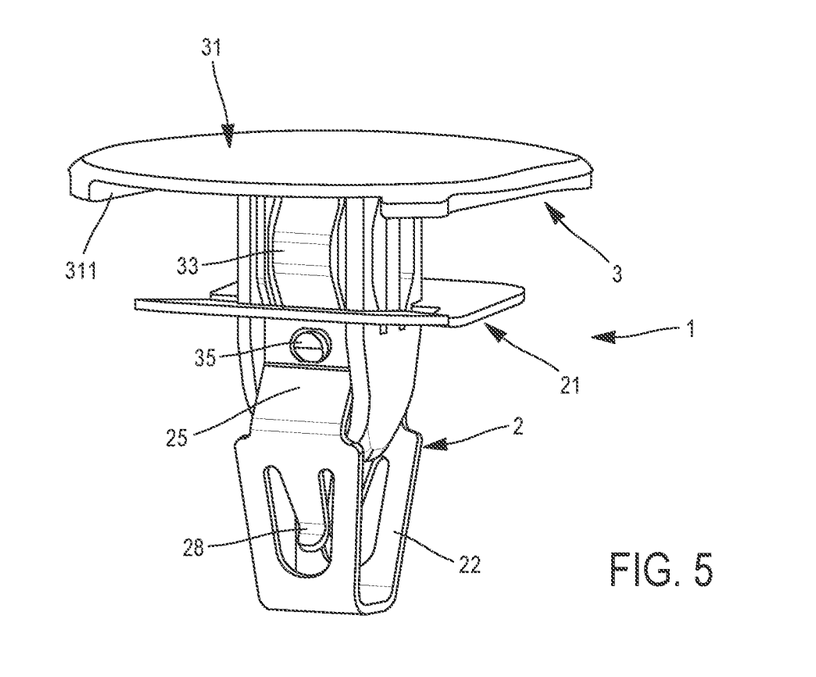
FIG. 5 shows a fastening device according to the present disclosure in the delivery position.

The first step, shown in FIG. 5, consists in assembling the clip 2 and the pin 3 in order to place the fastening device in the delivery position, in which the clip 2 is secured to the pin 3.

During this step, the pin 3 is introduced into the central opening 23 of the clip 2, aligning the guide ribs 34 with the slots 26 of the head of the clip 2, until the retaining notch 35 of the pin 3 fits into the locking hole 27 of the clip 2 and marks a stop point.

Figure 6A:
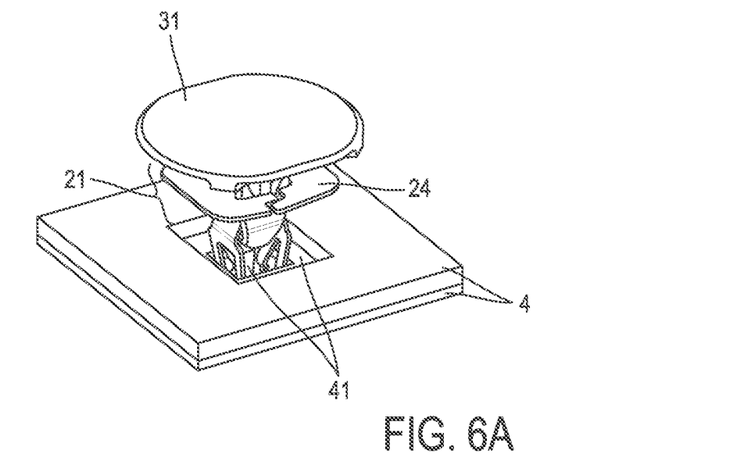
FIGS. 6A, 6B and 6C show the various stages of assembly of two planar elements using a fastening device according to the present disclosure.
Figure 6B:
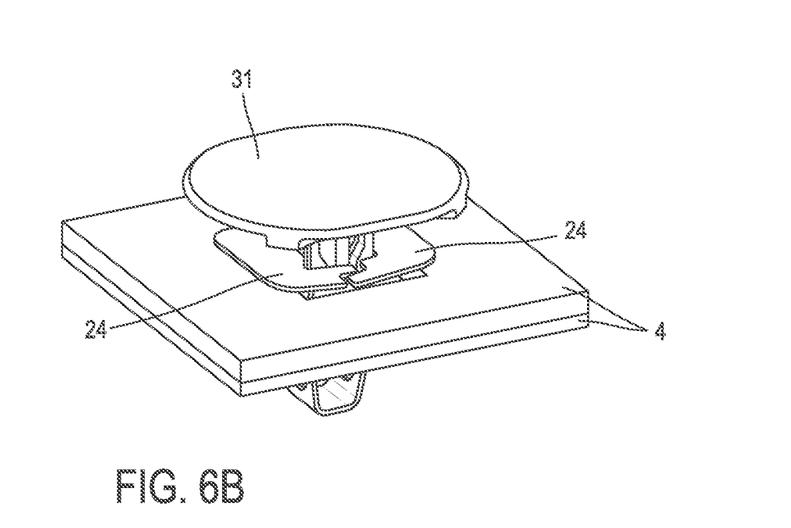

During the second step, and as shown by FIGS. 6A and 6B, the fastening device 1 is assembled with the planar elements 4. The fastening device 1 is inserted into the openings 41 of the planar elements 4 until the planar head 21 of the clip 2, and in particular, the pallets forming the planar head, come into abutment with the upper planar element. A first support point A is thus formed between the clip 2 and one of the planar elements 4. The assembled planar elements are positioned under the head of the clip 2 and against the outer face of the side upright members, in particular, when these have a V shape. During this step, the clip 2 and the pin 3 are still held in the delivery position.

Figure 6C:
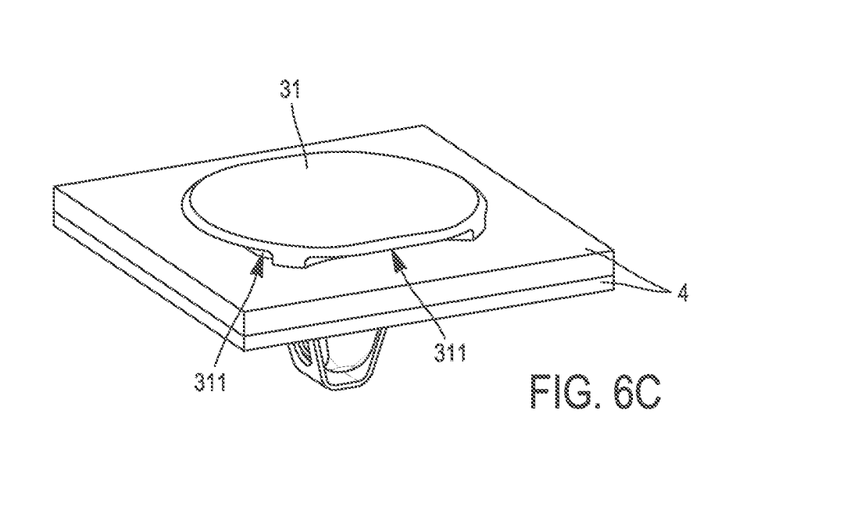
Figure 7:
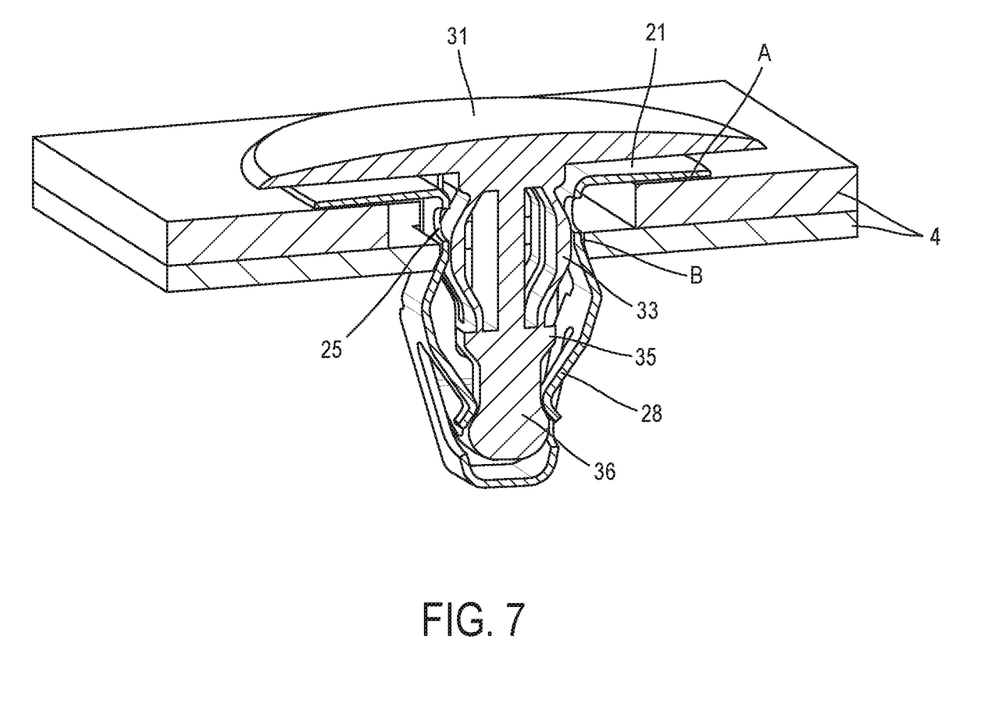
FIG. 7 shows a sectional view of a fastening device according to the present disclosure in the locked position.

During the third step, shown in FIGS. 6C and 7, the fastening device 1 is locked on the assembly formed from the planar elements. Pressure is exerted on the head 31 of the pin 3 in order to retract the retaining notch 35 from the locking hole 27 and to insert the pin 3 into the inner cavity of the clip 2 until the head 31 of the pin 3 is in abutment against the head 21 of the clip 2 and/or against the upper planar element.

After the retaining notch 35 has retracted from the locking hole 27, the pair of flexible bridging pieces 33 enters the inner cavity of the clip and comes to bear on the lateral upright members 22 so as to press them against the edges of the openings 41 of the planar elements 4, and, in particular, of the lower planar element, thus forming the second support point B making it possible to hold the planar elements against each another. In the locking position of the fastening device 1, and as can be seen in FIG. 7, the planar elements 4 are therefore held together by being wedged between the head 21 of the clip 2, which forms the first support point A, with the main surface of one of the planar elements 4, and the lateral upright members 22, which form the second support point B on another planar element 4. In other words and as can be seen in FIGS. 7 and 8, the flexible bridging pieces, in the locking position, are located at least partly at the opening between the first support point A and the second support point B.

Figure 8A:
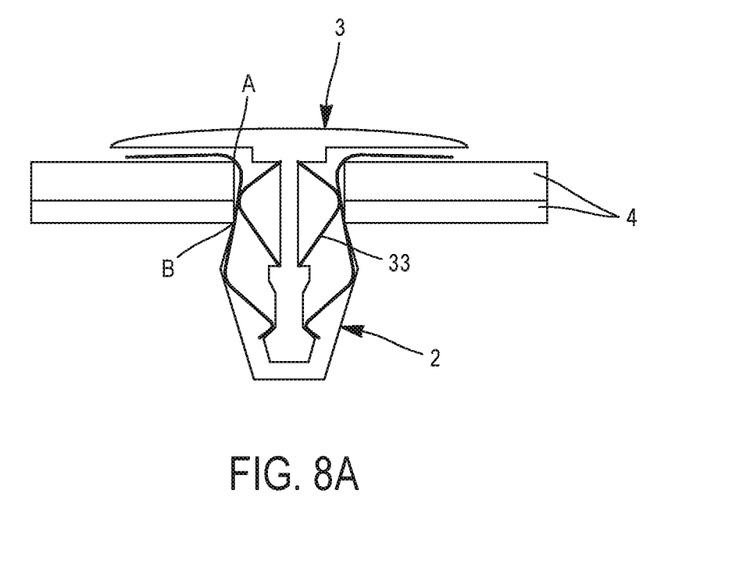
FIGS. 8A and 8B schematically show fastening devices according to the present disclosure in the locked position for two different thicknesses of planar elements.
Figure 8B:
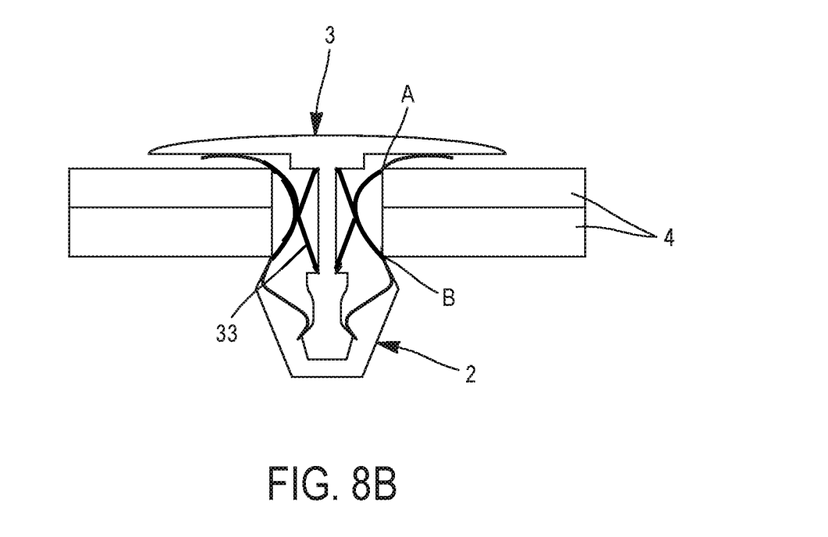

FIGS. 8A and 8B illustrate a fastening device 1 in the locking position for two different thicknesses of planar elements. More specifically, the planar elements of FIG. 8B have a greater thickness than those of FIG. 8A. It is observed that when the thickness of the planar elements 4 is greater, the lateral upright members 22 tend to be closer to each other, and to reduce the internal space, which they define. In this case also, the flexible bridging pieces 33 are deformed to allow the passage of the clip without requiring an increased assembly force. In the absence of these flexible bridging pieces 33, it would have been necessary to exert a significant assembly force to allow the passage of the clip 2 and to force-lock the second support point B on the side upright members.

Owing to the flexibility of the bridging pieces 33, it is thus possible to maintain the support points A, B by exerting an assembly force, which is less dependent on the thickness of the planar elements 4, while ensuring a significant retaining force preventing the extraction of the fastening device 1.

Indeed, depending on the thickness of the planar elements 4, the lateral upright members 22 of the clip 2, by virtue of their V shape, will more or less come closer to each another during the insertion of the clip 2 through the openings 41, thus modifying the dimensions of the central opening 23. The dimensions of the central opening 23 become smaller, in particular, with the increase in thickness of the planar elements 4.

The presence of flexible bridging pieces 33 allows the pin 3 to adapt, by deformation of the bridging pieces, to the variation in the dimensions of the central opening 23. In the absence of flexible bridging pieces 33, it would be necessary to provide an increasingly significant force with the increase in the thickness of the planar elements 4 in order to pass the pin 3 of fixed size through a central opening 23 whose dimensions become smaller.

The assembly force is therefore less dependent on the thickness of the planar elements 4 owing to the flexibility of the bridging pieces 33, which allow the dimensions of the pin 3 to be adjusted to the size of the central opening 23.

When inserting the pin 3 into the inner cavity of the clip 2, the blocking tabs 28 of the clip 2 also come into contact with the blocking zones 36 of the body of the pin 3. These blocking tabs 28 are first separated by the blocking zones 36, then close again above the blocking zone 36. The blocking tabs 28 thus exert a retaining force on the blocking zones 36 of the pin 3 in order to keep it in the position to lock.

Furthermore, the locking notch located downstream from the bridging pieces 33, when it is present, can be housed in the locking hole 27 so as to improve the retention of the fastening device in the locked position.

If it is desired to remove the fastening device 1 from the planar elements 4, the end of a tool can be inserted into one of the slots 311 of the head 31 of the pin 3 in order to create leverage and exert a sufficient force to bring fastening device 1 out of the locked state.

As will be readily understood, the present disclosure is not limited to the described embodiment, and it is possible to add variants thereto without departing from the scope of the invention as defined by the claims.

The invention claimed is:

1. A fastening device for attaching an assembly comprising at least two planar elements, the planar elements being provided with openings that face each other when the planar elements are in the assembly position, the fastening device comprising:
   a. a clip that is intended to be inserted into the openings of the planar elements and intended to hold the planar elements together between a first and a second support point, the clip comprising:
      i. a planar head forming the first support point on the main surface of one of the planar elements, the planar head having a central opening for accessing an inner cavity of the clip;
      ii. two lateral upright members forming the second support point on another of the planar elements, the lateral upright members having a first end secured to the planar head and a second end, the second ends being joined to each other, the two lateral upright members defining the inner cavity of the clip;
   b. a pin that is intended to be inserted into the inner cavity of the clip to lock the assembly; the pin comprising at least one flexible bridging piece having a central portion connected to a main body of the pin by two flexible portions, the flexible bridging piece being intended to come into contact with one of the lateral upright members of the clip in order to be force-locked at the second support point and to hold the assembled planar elements together.

2. The device of claim 1, wherein the planar head of the clip is formed by two support pallets, each support pallet being secured to one of the lateral upright members.

3. The device of claim 2, wherein each support pallet comprises at least one arm partially defining an outline of the central opening.

4. The device of claim 3, wherein the head of the clip has slots configured to cooperate with guide ribs on the pin.

5. The device of claim 4, wherein the lateral upright members have a V shape.

6. The device of claim 5, wherein the pin bears at least one retaining notch that is intended to be housed in at least one locking hole of the clip to hold the pin in the clip in a delivery position.

7. The device of claim 6, wherein the pin bears at least one locking notch that is intended to be housed in the locking hole of the clip to hold the pin in the clip a locking position.

8. The device of claim 7, wherein each lateral upright member of the clip has a blocking tab for cooperating with a blocking zone of the pin so as to hold the pin in the clip in the locking position.

9. The device of claim 8, wherein the pin is topped by a planar head.

10. The device of claim 9, wherein the planar head of the pin has at least one slot configured to accommodate an end of a tool to facilitate dismantling of the fastening device.

11. The device of claim 10, wherein the central portion of the bridging piece bears a boss.

12. The device of claim 11, wherein the pin is plastic and the clip is metal.

13. The device of claim 12, wherein the at least one flexible bridging piece of the pin comprises a pair of flexible bridging pieces for contacting the side upright members of the clip.

14. The device of claim 1, wherein the lateral upright members have a V shape.

15. The device of claim 1, wherein the pin bears at least one retaining notch that is intended to be housed in at least one locking hole of the clip to hold the pin in the clip in a delivery position.

16. The device of claim 1, wherein each lateral upright member of the clip has a blocking tab for cooperating with a blocking zone of the pin so as to hold the pin in the clip in a locking position.

17. The device of claim 1, wherein the pin is topped by a planar head.

18. The device of claim 1, wherein the central portion of the bridging piece bears a boss.

19. The device of claim 1, wherein the pin is plastic and the clip is metal.

20. The device of claim 1, wherein the at least one flexible bridging piece of the pin comprises a pair of flexible bridging pieces for contacting the side upright members of the clip.

* * * * *